United States Patent [19]

Beck et al.

[11] 4,044,231

[45] Aug. 23, 1977

[54] SECURE PROPERTY DOCUMENT AND METHOD OF MANUFACTURE

[75] Inventors: Charles K. Beck, Mentor; Francis C. Foote, Rocky River, both of Ohio

[73] Assignee: Addressograph Multigraph Corporation, Cleveland, Ohio

[21] Appl. No.: 581,428

[22] Filed: May 27, 1975

[51] Int. Cl.² .................. G06K 19/08; G06K 7/10; B42D 15/00; G11B 7/00

[52] U.S. Cl. .................. 235/61.12 N; 235/61.12 M; 283/57; 235/61.11 E; 179/100.3 V

[58] Field of Search .............. 250/266, 268, 269, 270; 235/61.7 B, 61.11 E, 61.12 N, 61.12 R; 340/149 A, 173 LT; 235/61.6 R; 283/57, 7; 179/100.3 V

[56] References Cited

U.S. PATENT DOCUMENTS

| 3,245,697 | 4/1966 | Nugent | 283/7 |
|---|---|---|---|
| 3,430,966 | 3/1969 | Gregg | 179/100.3 V |
| 3,455,577 | 7/1969 | Kikumoto | 283/57 |
| 3,536,894 | 10/1970 | Travioli | 235/61.6 R |
| 3,793,600 | 2/1974 | Grosbard | 235/61.12 N |
| 3,829,662 | 8/1974 | Furahashi | 235/61.12 R |
| 3,836,754 | 9/1974 | Toye | 235/61.12 N |
| 3,838,252 | 9/1974 | Hynes | 235/61.12 M |
| 3,919,447 | 11/1975 | Kilmer | 235/61.11 E |

Primary Examiner—Robert M. Kilgore
Attorney, Agent, or Firm—Harry M. Fleck, Jr.

[57] ABSTRACT

A secure property document is provided which includes an optical data set defined by radiant energy modifying elements underlying a magnetic data member for reflecting infrared radiation therethrough. Preferably, the infrared reflectors are comprised of a plurality of thin metallic elements vapor deposited onto a magnetic tape during manufacture prior to hot stamping.

15 Claims, 6 Drawing Figures

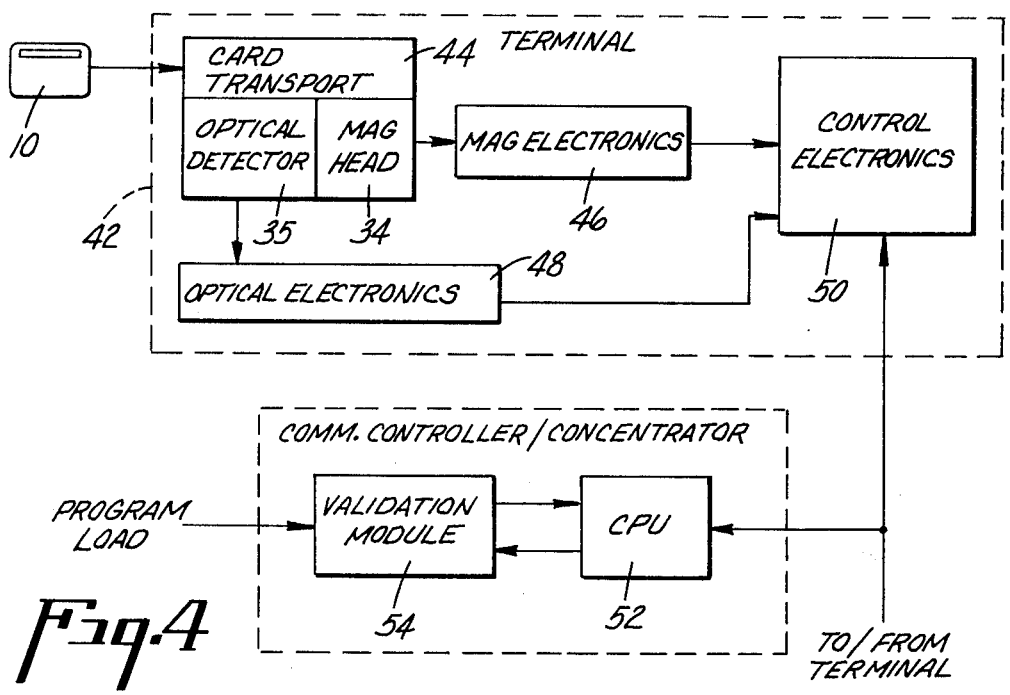
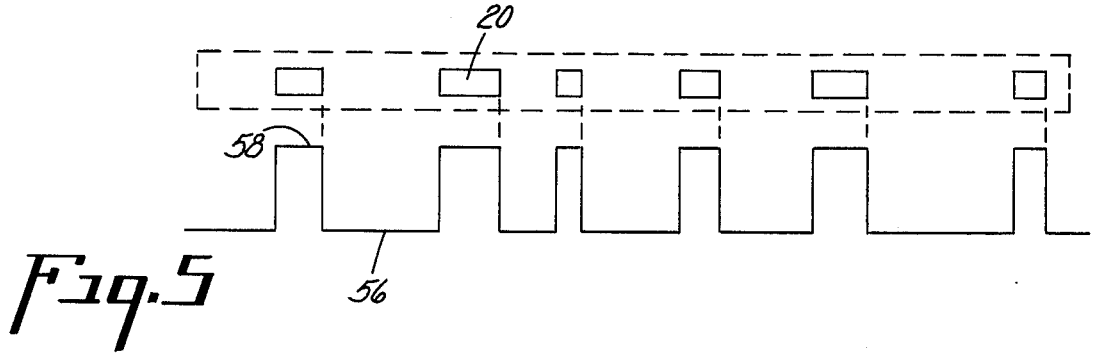
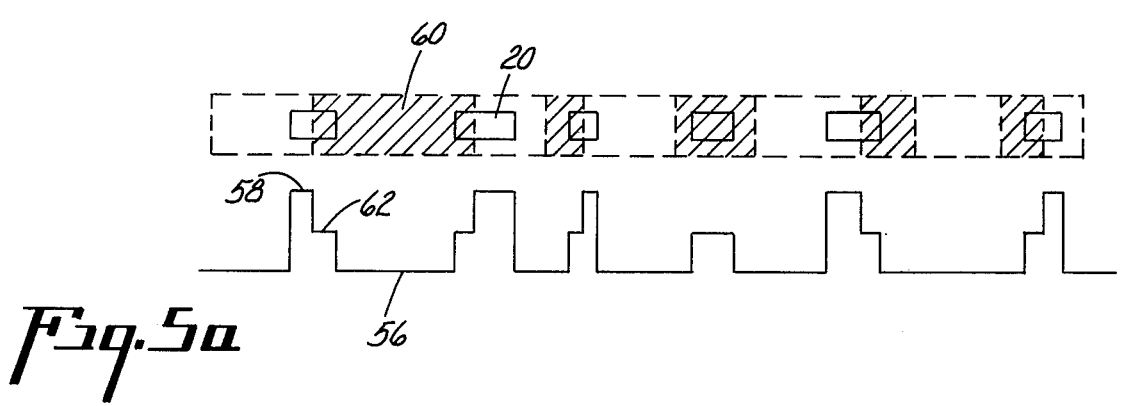

SECURE PROPERTY DOCUMENT AND METHOD OF MANUFACTURE

BACKGROUND OF THE INVENTION

The present invention is generally related to credit cards and, more particularly, to a secure property for credit cards and the like to render such fraud resistant.

In the past, various credit card structures and schemes have been proposed for preventing or avoiding fraud involving credit card transactions or the like. The types of fraud most often encountered may be categorized into two groups:

1. Credit card alteration, duplication and counterfeiting; and
2. Unauthorized use of a valid credit card, as in the case of a lost or stolen card.

The problems presented by unauthorized use have been alleviated to some extent through the use of personal identification procedures and insurance programs which limit the liability of the card owner.

On the other hand, it has proven more difficult to cope with credit card alteration and counterfeiting. The problem may become more serious as criminal elements continue to improve upon counterfeiting techniques, such as "skimming", which can be used to produce counterfeits both quickly and inexpensively. Cards are used more and more each day for transactions such as retain purchases, auto rentals, travel expenses, cash dispensing, and, most recently, electronic funds transfer. Many of these transactions involve large sums of money which presents an even greater inducement for criminal elements to counterfeit credit cards to defraud merchants and the like. It has been apparent that if the use of credit cards and like documents is to continue to grow in the business world, an adequate solution must be provided to this problem.

In recent years, credit card structures have been proposed with invisible codes or the like, which are used to distinguish counterfeits from authentic cards. For example, U.S. Pat. No. 3,468,046 issued to MAKISHAMA et al. discloses a card structure bearing normally invisible indicia which may be read under ultraviolet light. The indicia includes the card holder's signature which may be compared by the merchant with the customer's signed receipt or existing account records. This provides some degree of assurance that the person presenting the card is the true owner. However, it would not be difficult for a forger to duplicate the signature or to produce counterfeit cards by selecting appropriate filter material and fluorescent signature panels.

The use of infrared reflection and transmission for secrecy purposes has also been proposed. U.S. Pat. No. 3,829,660, issured to A. Furahashi, discloses a computer information card structure containing infrared reflective areas defined by adjacent IR absorbent ink, or alternately infrared transmissive holes. The ink and holes are concealed against visible detection by light top and bottom laminates of opaque material. This patent does not address itself specifically to the question of credit card security but rather computer card secrecy. If, in fact, the teachings were applied to credit cards, such would not provide a high degree of security as counterfeiting would merely involve dismantling of the card laminates to reveal the ink or holes which define the data.

U.S. Pat. No. Re. 28,081 in the name of J. E. Travioli discloses a Credit card structure including a pattern of infrared radiation transmitting holes. The hole pattern is read and resultant signals which identify the card are used to check the account's credit status through a central processor. The patent is not directed to the use of the infrared radiation pattern to determine the authenticity of the card. Furthermore, the card structure is such that a counterfeiter could easily reproduce the hole pattern by disassembling the card.

SUMMARY OF THE INVENTION

The secure property document of the present invention provides a solution to the problem of credit card counterfeiting. The document structure includes a magnetic data member, preferably in the form of a magnetic stripe, which overlies an optical data track comprising a plurality of radiant energy modifying elements. The magnetic member is opaque to visible radiation, yet transparent to infrared radiation. In one form of the invention, the radiant energy modifying elements are defined by vapor deposited material which reflects infrared radiation through the magnetic member. Thus, the presence of a reflector is detected by the reflection of infrared radiation through the magnetic member.

The opaque quality of the magnetic member makes it difficult to detect the size or positions of the reflective areas with visible radiation. The document is further provided with a concealing layer of material, such as ink containing a large percentage of opaque pigments, such as carbon, which underlies the reflective elements and is opaque to various wavelengths of radiation including the visible range. Since the reflective elements are concealed on both sides, it is highly difficult to determine and reproduce their exact size and positions. In the preferred embodiment, reflective elements are produced by vacuum deposition. The elements are extremely thin and are permanently bonded between the magnetic media and main body of the document. This makes it extremely difficult to determine the sizes and locations of the elements by grinding away the core stock or dismantling the card without destroying or distorting their interspacial relationship.

It is a primary object of the present invention to provide a novel card or document construction which is nearly impossible to duplicate or counterfeit.

It is still another object of the present invention to provide a unique method of manufacturing a secure property document including magnetic and optical data.

Another object of the present invention is to provide a secure property comprising a magnetic stripe which is opaque to visible light, an optical data set defined by radiant energy modifying elements underlying the magnetic stripe whereby the elements are concealed against detection by visible light.

It is a further object of the present invention to provide a secure property document including an optical data set defined by radiant energy reflecting areas such that the intensity and character of reflected radiant energy defines a signal pattern unique to the document and extremely difficult to duplicate or counterfeit.

BRIEF DESCRIPTION OF THE DRAWINGS

FIG. 4 is a simplified block diagram of a typical security system utilizing the secure property document of the present invention.

FIG. 5 is a diagram illustrating the optical data signals provided by the reader illustrated in FIG. 4.

FIG. 5a is a diagram similar to FIG. 5 but for a modified embodiment of the secure property of the present invention.

DETAILED DESCRIPTION OF THE PREFERRED EMBODIMENT

Figure 1:
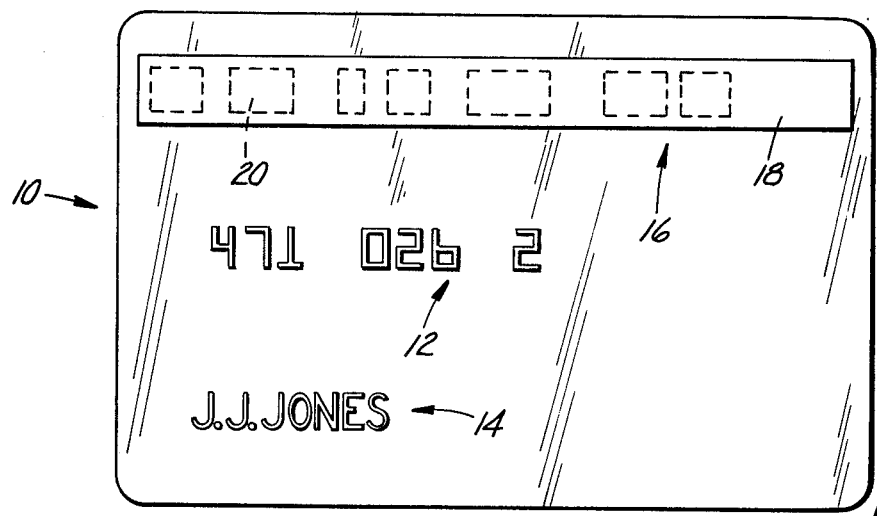
FIG. 1 is a top plan view of a typical document including the secure property of the present invention.
Figure 2:
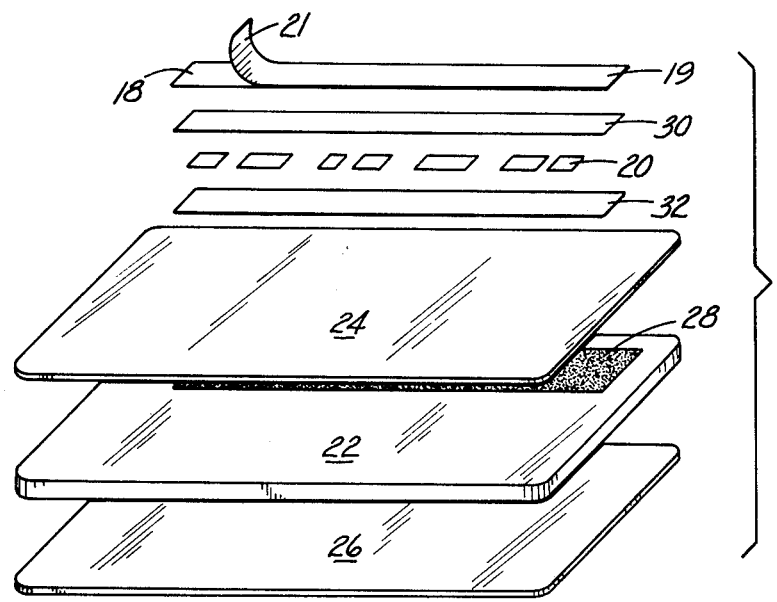
FIG. 2 is an exploded perspective view of the document illustrated in FIG. 1.

Referring now, more particularly, to FIGS. 1 and 2 of the drawings, the secure property document of the present invention is generally indicated by the numeral 10 and may include embossed data defining the account number and card holder's name as indicated at 12 and 14, respectively. The embossed data may be read by conventional embossed character readers and in a typical operation would be utilized to imprint sales receipt forms or the like.

The document is further provided with optical and magnetic data sets which reside in an area near the top edge of the card; this area being generally indicated by the numeral 16. In the preferred embodiment, the document is similar, if not identical, in appearance to a conventional magnetic stripe-type card, with magnetic data residing within an elongated generally rectangular area 18. The magnetic stripe may include a plurality of magnetic data tracks, including TRACK 1 and TRACK 2 which meet the standards of ANSI X4.16-1973. Preferably, TRACK 1 would contain account number and identifier information while TRACK 2 would contain additional information normally not rewritten. A third track (TRACK 3) may be provided containing information which is often updated or changed as the card is used in transactions. Such information typically might include account balance, frequency of usage data, and date cycle information. Of course, it is not intended that the magnetic stripe alone comprise a part of the secure property of the present invention.

The secure property is defined at least in part by an optical data set lying within the data area 16 and comprised of a plurality of radiant energy modifying elements 20 which underlie magnetic stripe 18. In the preferred embodiment, the radiant energy modifying elements are comprised of vapor deposited reflectors, such as of aluminum, which reflect incident radiant energy, particularly that in the infrared range. The presence of absence of the reflector is sensed by an appropriate optical detector, hereinafter described.

Referring now, more particularly, to FIG. 2, it will be appreciated that the main body of the document is comprised of three polyvinyl chloride (PVC), or polyvinyl chloride acetate, layers 22, 24 and 26 laminated together. Center layer 22, commonly referred to as the core stock, preferably contains pigments and plasticizers and has a matte finish. The top and bottom laminants 24 and 26 are smooth, thin, clear sheets, which are adhered to the core stock by conventional techniques and may be provided with colored areas and readable indicia. It is foreseeable that laminant layers 24 and 26 may be eliminated from the main body structure, if desirable.

During manufacture, prior to lamination, the top or bottom surface of the core stock 22 is provided with a shielding layer or coating of material 28 which is generally opaque to the transmission of radiant energy. In the preferred embodiment, ink containing a high percentage of carbon black is silk screened onto the core stock in general alignment with data area 16 to provide the desired shielding characteristics. It has been found that "OPAK" vinyl black sold by Union Ink Company, but with approximately twice the normal commercial carbon concentration, provides satisfactory results. The carbon black absorbs a large percentage of incident radiation, thereby making it difficult, if not impossible, to detect the sizes and relative positions of the reflective elements by the transmission of infrared radiation through the document. This shielding layer is generally opaque to radiation throughout a wide frequency range which includes infrared, visible light and X-rays. Materials other than carbon may be added to enhance opacity to particular wavelengths. For example, $BaSO_4$ or lead salts will increase opacity to X-rays.

Preferably, reflective elements 20 are provided by vapor depositing aluminum or some other metallic materials, onto the bottom surface of the magnetic tape prior to the hot stamping process. Alternately, the vapor deposition may be made onto the core stock, if optically smooth or polished, or onto the associated top laminant. The vapor deposition process involves the evaporation of aluminum under a vacuum. The aluminum vapor condenses onto the magnetic tape or other substrate and becomes permanently bonded thereto to define highly reflective areas which are readily detectable by reflected infrared radiation. It has been found that vapor deposited aluminum of a thickness in the range of 100–500 Angstroms provides reflection of a substantial portion of incident infrared radiation. As the thickness and resultant optical density of the deposited aluminum is increased, the percentage of radiation reflected also increases. While this is not a linear function, the thickness, or density, of aluminum deposited may be intentionally varied to provide optical signals which also vary in intensity. It should be noted that the reflectors may be defined by elements other than vapor deposited aluminum. Many other metallic elements and alloys may be applied by vapor deposition, or other techniques, to provide suitable reflection. It has also been found that compounds such as stannous oxide may be vapor deposited and provide detectable reflection.

It has been found that the magnetic media surfaces of most commercially available magnetic tapes are optically "rough" in the sense that they diffusely refelect incident radiation, rather than providing specular reflection. If the reflective elements are vapor deposited directly onto the magnetic media surface, they also will be optically rough. This will result in diffuse reflection, making it diffcult to detect the presence of the reflective elements with a degree of accuracy acceptable for security purposes. This optical roughness may be corrected by various techniques prior to the step of vapor deposition. It has been found that the magnetic media may be made optically smooth by applying an appropriate coating 30 to the magnetic media side of the tape which dries in the form of a glossy layer. Many coatings may be suitable for this purpose, so long as such are compatible with the reflectors, magnetic media and core stock. It has been found that a copolymer of vinyl chloride and vinyl acetate dissolved in a suitable solvent such as a mixture of 2-nitropropane and nitroethane provides satisfactory results. One such suitable copolymer is sold by Union Carbide Corporation under the trademark VINYLITE VMCH. When the coating has dried and cured if necessary, it provides a surface of suitable specularity or optical smoothness such that the vapor deposited elements will also exhibit suitable specularity since such conform to the coating. For other types of reflectors which are not vapor deposited, the coating may not be necessary.

In the preferred embodiment the reflective material is vapor deposited directly onto the above-described organic coating. Since high temperatures may cause wrinkling or other deformation of the tape during the vapor deposition, a grease, such as Convalex-10, is applied to the polyester side of the tape which is subsequently held in contact with a colling plate or other suitable heat sink during the vapor deposition. The grease serves as a good thermal conductor which aids in cooling the tape. After the vapor deposition is completed, the grease is removed with the aid of an appropriate solvent. For high volume production, other means of temperature control may be employed which do not require the grease and cleaning step.

Preferably, the magnetic stripe media 18 is formed by use of a conventional "hot stamp", or other laminating process. Briefly, this process involves the application of a magnetic tape 19 over the top laminant through the application of heat and pressure, and the subsequent stripping away of the polyester, indicated by the numeral 21 in FIG. 2. In order to bind the magnetic media and associated reflective elements to the core stock and top laminant, an appropriate adhesive, indicated by the numeral 32, is applied to the tape and/or top laminant associated with the core stock prior to hot stamping. Vinylite VMCH dissolved in a suitable solvent such as 2-nitropropane and nitroethane, has been found to be a satisfactory adhesive for the hot stamp process.

It has been found that magnetic medium comprised of gamma ferric oxide ($\gamma$-$Fe_2O_3$) is substantially transparent to infrared radiation and permits satisfactory detection of the underlying reflectors. It will be appreciated that the $\gamma$-$Fe_2O_3$ is substantially opaque to normal visible radiation and thereby conceals the underlying reflectors against detection by the naked eye. The tape coating should not contain carbon black as such will absorb the incident infrared radiation and thereby attenuate the reflected radiation. For optimum results no carbon black should be present in the tape coating. However, a small percentage of carbon black may be tolerable as long as such does not significantly alternate or diffuse the reflected infrared radiation.

Figure 3:
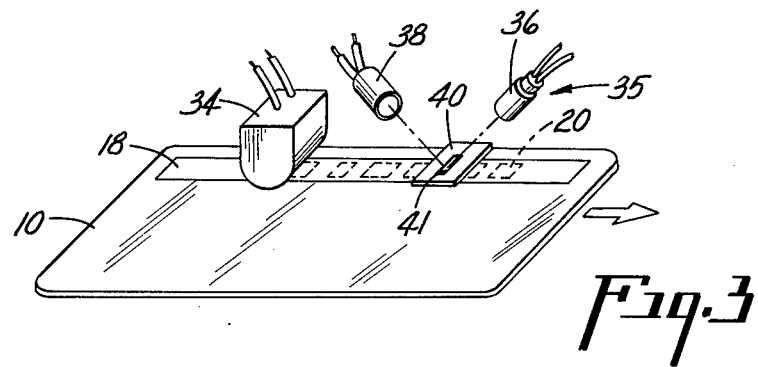
FIG. 3 is a simplified perspective view of the secure property document of the present invention in conjunction with an optical/magnetic reader.

FIG. 3 is a simplified diagrammatic illustration of a typical reader assembly which may be utilized with the secure property document of the present invention. The assembly includes a conventional magnetic read head 34 mounted in a predetermined spacial relationship to an infrared detector generally indicated by numeral 35, including a source of infrared radiation 36 and a detector 38. Preferably, a shield member 40 is provided which overlies a portion of the card and is provided with a narrow slit 41 allows a narrow beam of infrared radiation to penetrate the magnetic media and reach the underlying reflective elements. As the card or document is transported by appropriate means, not illustrated, magnetic data is provided by read head 34 and optical data representative of the reflective elements 20 is provide by sensor 38. There are various commercially available infrared sensors and sources which may be utilized. One such suitable detector is of the PbS type sold by Optoelectronics, Inc. as the OE-20 series. This detector is highly sensitive to radiation of 1–3 microns in wavelength.

Referring now to FIG. 5, the nature of the optical data generated by the reflective elements may be more fully understood. As the document passes beneath the optical detector 35, the intensity of sensed infrared radiation varies considerably between background areas and reflective areas. The signal generated by sensor 38 in the absence of a reflective element is indicated by the numberal 56 and is negligible in strength since a large percentage of the incident infrared radiation is absorbed by the carbon black contained in the underlying shielding layer 28. When a reflective element 20 passes beneath the detector, the resultant signal is increased significantly to a higher level as indicated by the numeral 58. At the trailing edge of the reflective element, the signal drops back to the background level and remains there until the leading edge of the next reflective element is detected.

When all of the reflective elements have been detected, the resultant optical signal pattern is utilized to determine the authenticity of the card. The number, sizes, and positions of the reflective elements may be varied during the manufacturing process. If desired, the reflective elements may be produce randomly or within controlled limits such that the resultant signal pattern is substantially unique to the particular card. The security system may be designed to detect the leading or trailing edges of the reflectors, or both. It also is foreseeable that the security system could be designed to analyze the area of the reflective elements or possibly ignore the signals generated by some elements, thereby further enhancing the degree of overall system security.

FIG. 5a illustrates a modified form of the secure property. Since the optical detector senses a narrow beam of reflected radiation, the resultant signal strength is influenced to some extent by the optical smoothness of the surface interfacing with the reflective elements. An intermediate or secondary level of reflectivity may be provided by intentionally modifying or deteriorating the optical smoothness at the interface.

If the above-described organic coating is utilized, such may be blurred by physical or chemical means in areas which overlie, or partially coincide, with the reflective elements. These areas are shown in cross-hatch and are indicated by the numeral 60 in FIG. 5a. The partial diffusion caused in areas 60 reduces the intensity of sensed radiation. This results in a diminished signal level, such as indicated by the numeral 62. The dual levels of reflectivity provide a resultant signal pattern which is processed by an appropriate system to provide an added degree of security. It will be appreciated that dismantling the document or grinding away of the core stock or magnetic media in an attempt to determine the secondary reflective pattern will result in distortion or deterioration of the organic coating such that the modified areas will not be distinguishable from the original glossy areas.

It has been discovered that the organic coating may be "blurred" by contacting areas with a piece of cloth, or similar material having an irregular surface, carrying an appropriate solvent. This softens or distorts a portion of the coating, such that by controlling the operation the desired degree of roughness may be achieved. It has been found that when utilizing the above-described coating of VMCH, a solvent such as methyl ethyl ketone (MEK) provides satisfactory results. Of course, other techniques such as the application of heat with a metal iron or suitable instrument may be utilized to produce satisfactory results also.

FIG. 4 is a block diagram of a typical security system utilizing the document of the present invention. Such a system is described in detail in copending application entitled Security System, filed concurrently with the present application, and assigned to the assignee of the present invention. Such a system includes a plurality of remote terminals, one such terminal is generally indicated by the numeral 42 and contains a card transport 44 in conjunction with the above-described magnetic read head 34 and optical detector 35. Signals from magnetic read head 34 are fed to appropriate circuitry 46, while the optical data signals are received by circuitry indicated by numeral 48. The magnetic and optical data signals are appropriately processed by circuits 46 and 48 before being fed to a communication control 50, which in turn sends the signals to a central processing unit (CPU) 52 and associated validation module 54.

The validation module is appropriately programmed to determine whether or not the presented document is authentic. This determination may be made in many different ways depending upon the nature of the system and the degree of security desired. One such arrangement entails reading of the optical data from the card at the time of manufacture and storing such at the CPU/Validation Module in accordance with the card's account number or other appropriate identifier. The optical data may be encrypted with encryption algorithm to further enhance the security of the system. When the card is subsequently presented to the system the optical data read at the terminal is processed, encrypted if appropriate, and then compared with the data or code previously stored at the CPU. If the codes compare within predetermined limits acceptable to the system, an approval signal 1 is sent back to the terminal to indicate that the card is authentic. On the other hand, if the generated code or data does not meet the system requirements, a corresponding signal is registered at the terminal, whereby the terminal operator may refuse to accept the card or require additional information before processing the transaction. It is not intended that the secure property document of the present invention be limited to use with the security system illustrated in FIG. 4, as many types of security systems may be provided by those skilled in the art to determine the authenticity of the document of the present invention.

From the foregoing description, it will be appreciated that the secure property document of the present invention is highly difficult of duplicate or counterfeit. The magnetic strip applied to the top surface of the card provides a dual function in that it both contains magnetic data and conceals the underlying reflective elements against detection with visible radiation. The reflective elements are preferably vapor deposited and metallic in nature. Such elements provide a high degree of reflectivity, yet are thin enough that bumps or protrusions do not appear on the upper surface of the magnetic stripe which might aid in their detection by a counterfeiter. Also, it would be extremely difficult to expose the vapor deposited elements by grinding away the core stock or dismantling the card. This would destroy the extremely thin reflectors or distort their interspacial relationship which defines the optical signal pattern unique to the document. Since the reflective elements are concealed on both sides, it is not possible to photograph such by reflecting or transmitting radiation through the card. Detection with X-radiation has also been found unsatisfactory, due in part to thinness of the elements and the effect of the shielding layer 28.

Since the foregoing description and drawings are merely illustrative, the scope of protection of the invention has been more broadly stated in the following claims, and these should be liberally interpreted so as to obtain the benefit of all equivalence to which the invention is fairly entitled.

We claim:

1. A fraud resistant document comprising:
   a main body,
   a plurality of radiant energy reflectors overlying said main body in a data area for reflecting incident radiant energy of predetermined characterisitcs.
   a magnetic recording member overlying said radiant energy reflectors, said member being substantially transparent to said radiant energy and generally opaque to normal visible light whereby said reflectors are at least partially concealed against detection by the naked eye, and
   a layer of material on the bottom of said magnetic recording member having a lower reflector-receiving surface interfacing with said reflectors, said layer of material being substantially transparent to said radiant energy and said surface having known general microtopographical characteristics,
   said reflectors comprising thin elements particle deposited onto said reflector-receiving surface, each element having a reflective surface interfacing with said reflector-receiving surface and having substantially the same microtopographical characteristics as said reflector-receiving surface.

2. The fraud resistant document set forth in claim 1 wherein said layer of material comprises a coating of material applied to said magnetic recording member.

3. The fraud resistant document set forth in claim 2 wherein said magnetic recording member comprises magnetic recording medium, said coating being applied to the surface of said magnetic medium.

4. The fraud resistant document set forth in claim 3 wherein said coating bonds said reflectors to said magnetic medium.

5. A method of manufacturing a fraud resistant document comprising the steps of:
   providing a document body member and a magnetic recording member substantially transparent to radiant energy of predetermined characteristics and generally opaque to visible light,
   providing a reflector-receiving surface on said magnetic recording member, said surface being of known general microtopographical characteristics,
   depositing particles of reflector material onto said receiving surface to build up a thin layer thereof at various locations on said receiving surface to provide a plurality of radiant energy reflector elements each having a reflector surface with microtopographical characteristics substantially the same as those of said receiving surface, and
   securing said magnetic recording member to said document body member with said radiant energy reflector elements disposed therebetween.

6. The method set forth in claim 5 wherein said step of providing a reflector-receiving surface includes the step of coating said magnetic recording member with a layer of material with the exposed surface thereof being of known microtopographical characteristics.

7. The method set forth in claim 6 wherein said layer of material also serves as an adhesive bonding said reflector elements to said recording member.

8. The method set forth in claim 7 wherein the step of securing said magnetic recording member includes the application of heat and pressure.

9. A method of manufacturing a fraud resistant document comprising the steps of:
providing a document body member and a magnetic recording member substantially transparent to radiant energy of predetermined characteristics and generally opaque to visible light,
providing a reflector-receiving surface on said document body member, said surface being of known general microtopographical characteristics,
depositing particles of reflector material onto said receiving surface to build up a thin layer thereof at various locations on said receiving surface to provide a plurality of radiant energy reflector elements each having a reflector surface with microtopographical characteristics substantially the same as those of said receiving surface, and
securing said magnetic recording member to said document body member with said radiant energy reflector elements disposed therebetween.

10. The method set forth in claim 9 wherein said step of providing a reflector-receiving surface includes the step of coating said document body member with a layer of material with the exposed surface thereof being of known microtopographical characteristics.

11. The method set forth in claim 10 wherein said layer of material also serves as an adhesive bonding said reflector elements to said document body member.

12. The method set forth in claim 11 wherein the step of securing said magnetic recording member includes the application of heat and pressure.

13. A method of manufacturing a security tape having a magnetic recording medium and reflector elements, whereby the microtopography of the reflector elements is controlled to provide desired reflective characteristics, said method comprising:
providing a magnetic recording member comprising an elongated web having a magnetic recording medium disposed on one side thereof which is substantially transparent to radiant energy of predetermined characteristics and generally opaque to normal visible light,
coating at least a portion of the exposed side of said magnetic recording medium with a layer of material, the exposed side of which defines a reflector-receiving surface of known general microtopographical characteristics, and
depositing particles of reflector material onto said receiving surface to build up a thin layer thereof at various locations on said receiving surface and with microtopographical characteristics substantially the same as those of said receiving surface, said elements being such that incident radiant energy of said predetermined characteristics is reflected by each said reflective surface,
said layer of material providing an adhesive bond between said reflector material and said magnetic medium an defining the desired reflective characteristics of the reflective surfaces.

14. The method set forth in claim 13 wherein said reflector-receiving surface is generally optically smooth whereby reflections of incident radiant energy of said predetermined characteristics are generally specular in nature.

15. The method set forth in claim 14 together with the additional step of applying an adhesive coating over said first-mentioned coating and said reflector elements are deposited thereon.

* * * * *

UNITED STATES PATENT AND TRADEMARK OFFICE
CERTIFICATE OF CORRECTION

PATENT NO. : 4,044,231

DATED : August 23, 1977

INVENTOR(S) : Charles K. Beck and Francis C. Foote

It is certified that error appears in the above-identified patent and that said Letters Patent are hereby corrected as shown below:

Column 5, line 59, after "41" insert "which"

Signed and Sealed this

Sixth Day of June 1978

[SEAL]

Attest:

RUTH C. MASON
Attesting Officer

DONALD W. BANNER
Commissioner of Patents and Trademarks